(12) United States Patent
Myers et al.

(10) Patent No.: US 6,573,205 B1
(45) Date of Patent: Jun. 3, 2003

(54) STABLE ELECTRET POLYMERIC ARTICLES

(75) Inventors: David Lewis Myers, Cumming, GA (US); John Joseph Lassig, Lawrenceville, GA (US); Leonid Anthony Turkevich, Alpharetta, GA (US); David Grant Midkiff, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/492,607

(22) Filed: Jan. 27, 2000

Related U.S. Application Data

(60) Provisional application No. 60/117,703, filed on Jan. 30, 1999.

(51) Int. Cl.$^7$ .............................. H01G 7/02; B03C 3/28; D01F 6/04; D04H 1/00; D04H 3/00
(52) U.S. Cl. ................... 442/414; 442/221; 442/286; 442/301; 442/370; 442/381; 442/394; 442/400; 442/401; 442/408; 428/131; 428/304.4; 428/323; 428/372; 428/500; 55/DIG. 39; 307/400
(58) Field of Search .................. 442/414, 381, 442/382, 392, 400, 401, 408, 370, 394, 268, 301, 221, 286; 428/131, 304.4, 323, 500, 372; 55/DIG. 39; 307/400

(56) References Cited

U.S. PATENT DOCUMENTS

| 3,016,599 A | 1/1962 | Perry, Jr. |
|---|---|---|
| 3,341,394 A | 9/1967 | Kinney |
| 3,655,862 A | 4/1972 | Dorschner et al. |
| 3,692,618 A | 9/1972 | Dorschner et al. |
| 3,704,198 A | 11/1972 | Prentice |
| 3,705,068 A | 12/1972 | Dobo et al. |
| 3,745,142 A | 7/1973 | Mahlman |
| 3,746,142 A | 7/1973 | Hepp et al. |
| 3,755,527 A | 8/1973 | Keller et al. |
| 3,767,444 A | 10/1973 | Zeisberger |

(List continued on next page.)

FOREIGN PATENT DOCUMENTS

| EP | 0 594 123 | 4/1994 |
|---|---|---|
| EP | 0 623 941 | 11/1994 |
| GB | 1042906 | 10/1964 |
| JP | 60-126310 | 7/1985 |
| JP | 63-202663 | 8/1988 |

(List continued on next page.)

OTHER PUBLICATIONS

Abstract of JP 06–313058.
Japanese Abstract for 63–288216A.
Japanese Abstract for 60–126310A.
Japanese Abstract for 63–202663.
Japanese Abstract for 63–085112.

(List continued on next page.)

*Primary Examiner*—Cheryl A. Juska
(74) *Attorney, Agent, or Firm*—Christos S. Kyriakou; Douglas H. Tulley, Jr.; William W. Letson

(57) ABSTRACT

A porous polymeric sheet is provided having an electrostatic charge and comprising a zero-three composite of a polymeric matrix and a ferroelectric material dispersed therein. The polymeric component comprises a non-polar thermoplastic polymer, such as a polyolefin, and a second thermoplastic polymer having polar functional units, such as a telomer. The composite material is formed into a porous sheet and is electrically or corona poled to create an electret material which is well suited four use in various filtration, air-masking and dust wipe applications.

23 Claims, 2 Drawing Sheets

U.S. PATENT DOCUMENTS

| | | |
|---|---|---|
| 3,802,817 A | 4/1974 | Matsuki et al. |
| 3,849,241 A | 11/1974 | Butin et al. |
| 3,853,651 A | 12/1974 | Porte |
| 3,959,421 A | 5/1976 | Weber et al. |
| 3,978,185 A | 8/1976 | Butin et al. |
| 4,002,779 A | 1/1977 | Nischwitz |
| 4,041,203 A | 8/1977 | Brock et al. |
| 4,064,605 A | 12/1977 | Akiyama et al. |
| 4,091,140 A | 5/1978 | Harmon |
| 4,100,319 A | 7/1978 | Schwartz |
| 4,100,324 A | 7/1978 | Anderson et al. |
| 4,118,531 A | 10/1978 | Hauser |
| 4,215,682 A | 8/1980 | Kubik et al. |
| 4,229,187 A | 10/1980 | Stockford et al. |
| 4,308,223 A | 12/1981 | Stern |
| 4,315,881 A | 2/1982 | Nakajima et al. |
| 4,340,563 A | 7/1982 | Appel et al. |
| 4,342,849 A | 8/1982 | Kennedy |
| 4,375,718 A | 3/1983 | Wadsworth et al. |
| 4,405,297 A | 9/1983 | Appel et al. |
| 4,434,204 A | 2/1984 | Hartman et al. |
| 4,468,432 A | 8/1984 | Matsukura et al. |
| 4,513,049 A | 4/1985 | Yamasaki et al. |
| 4,564,721 A | 1/1986 | Sills et al. |
| 4,588,537 A | 5/1986 | Klaase et al. |
| RE32,171 E | 6/1986 | Van Turnhout |
| 4,592,815 A | 6/1986 | Nakao |
| 4,622,259 A | 11/1986 | McAmish et al. |
| 4,626,263 A | 12/1986 | Inoue et al. |
| 4,627,811 A | 12/1986 | Greiser et al. |
| 4,644,045 A | 2/1987 | Fowells |
| 4,652,282 A | 3/1987 | Ohmori et al. |
| 4,663,220 A | 5/1987 | Wisneski et al. |
| 4,789,504 A | 12/1988 | Ohmori et al. |
| 4,874,399 A | 10/1989 | Reed et al. |
| 4,874,659 A | 10/1989 | Ando et al. |
| 4,917,942 A | 4/1990 | Winters |
| 4,963,390 A | 10/1990 | Lipeles et al. |
| 4,969,457 A | 11/1990 | Hubbard et al. |
| 5,057,710 A | 10/1991 | Nishiura et al. |
| 5,070,223 A | 12/1991 | Colasante |
| 5,110,620 A | 5/1992 | Tani et al. |
| 5,112,677 A | 5/1992 | Tani et al. |
| 5,143,767 A | 9/1992 | Matsuura et al. |
| 5,165,979 A | 11/1992 | Watkins et al. |
| 5,188,885 A | 2/1993 | Timmons et al. |
| 5,204,174 A | 4/1993 | DaPonte et al. |
| 5,238,634 A | 8/1993 | Fetters et al. |
| 5,246,637 A | 9/1993 | Matsuura et al. |
| 5,256,176 A | 10/1993 | Matsuura et al. |
| 5,270,121 A | 12/1993 | Kissel |
| 5,271,883 A | 12/1993 | Timmons et al. |
| 5,288,402 A | 2/1994 | Yoshida |
| 5,304,227 A | 4/1994 | Matsuura et al. |
| 5,350,620 A | 9/1994 | Sundet et al. |
| 5,350,624 A | 9/1994 | Georger et al. |
| 5,382,400 A | 1/1995 | Pike et al. |
| 5,401,446 A | 3/1995 | Tsai et al. |
| 5,405,913 A | 4/1995 | Harwood et al. |
| 5,407,581 A | 4/1995 | Onodera et al. |
| 5,409,765 A | 4/1995 | Boettcher et al. |
| 5,409,766 A | 4/1995 | Yuasa et al. |
| 5,411,576 A | 5/1995 | Jones et al. |
| 5,429,848 A | 7/1995 | Ando et al. |
| 5,472,481 A | 12/1995 | Jones et al. |
| 5,482,765 A | 1/1996 | Bradley et al. |
| 5,482,772 A | 1/1996 | Strack et al. |
| 5,534,335 A | 7/1996 | Everhart et al. |
| 5,540,756 A | 7/1996 | Hoppitt et al. |
| 5,554,722 A | 9/1996 | Eichenauer et al. |
| 5,558,809 A | 9/1996 | Groh et al. |
| 5,560,992 A | 10/1996 | Sargent et al. |
| 5,597,645 A | 1/1997 | Pike et al. |
| 5,607,766 A | 3/1997 | Berger |
| 5,609,947 A | 3/1997 | Kamei et al. |
| 5,610,455 A | 3/1997 | Allen et al. |
| 5,620,785 A | 4/1997 | Watt et al. |
| 5,635,134 A | 6/1997 | Bourne et al. |
| 5,645,057 A | 7/1997 | Watt et al. |
| 5,645,627 A | 7/1997 | Lifshutz et al. |
| 5,652,048 A | 7/1997 | Haynes et al. |
| 5,658,640 A | 8/1997 | Berrigan et al. |
| 5,658,641 A | 8/1997 | Berrigan et al. |
| 5,688,157 A | 11/1997 | Bradley et al. |
| 5,694,925 A | 12/1997 | Reese et al. |
| 5,707,735 A | 1/1998 | Midkiff et al. |
| 5,709,735 A | 1/1998 | Midkiff et al. |
| 5,721,180 A | 2/1998 | Pike et al. |
| 5,726,107 A | 3/1998 | Dahringer et al. |
| 5,765,556 A | 6/1998 | Brunson et al. |
| 5,800,866 A | 9/1998 | Myers et al. |
| 5,817,415 A | 10/1998 | Chou et al. |
| 5,855,784 A | 1/1999 | Pike et al. |
| 5,871,845 A | 2/1999 | Dahringer et al. |
| 5,955,546 A | 9/1999 | Bates et al. |
| 5,976,208 A | 11/1999 | Rousseau et al. |
| 6,001,299 A | 12/1999 | Kawabe et al. |
| 6,002,017 A * | 12/1999 | Rousseau et al. ........... 548/451 |

FOREIGN PATENT DOCUMENTS

| | | |
|---|---|---|
| JP | 63-288216 | 11/1988 |
| WO | 95/13856 | 5/1995 |
| WO | 96/13319 | 5/1996 |
| WO | 97/07272 | 2/1997 |
| WO | WO9711991 | 4/1997 |
| WO | 97/23246 | 7/1997 |
| WO | 97/44509 | 11/1997 |

OTHER PUBLICATIONS

Japanese Abstract 08–067704.
John Wiley & Sons, Encyclopedia of Polymer Science and Engineering, vol. 16, 1989, pp. 494–554.
Journal of Applied Polymer Science, Studies of Polymer Electrets, vol. 27, 1982, pp. 381–395.
"Polymer–Ferroelectric Ceramic Composites" by Karol Mazur, Ch. 11, pp. 539–610.
"Superfine Thermoplastic Fibers" by V.A. Wente, Industrial and Engineering Chemistry, vol. 48, No. 8, pp. 1342–1346 (1956).
"Manufacture of Superfine Organic Fibers" by V.A. Wente et al, Naval Research Laboratory, Washington, D.C., NRL Report 4364 (111437), May 25, 1994, US Dept of Commerce, Office of Technical Services.
"Melt Blowing—A One–Step Web Process for New Nonwoven Products" by R.R. Butin et al., Journal of the Technical Association of the Pulp and Paper Industry, vol. 56, No. 4, pp. 74–77 (1973).

* cited by examiner

STABLE ELECTRET POLYMERIC ARTICLES

This application claims the benefit of Provisional application No. 60/117,703, filed Jan. 30, 1999.

FIELD OF THE INVENTION

The present invention relates to polymeric electret materials and, more particularly, the present invention relates to polymeric electret filtration materials.

BACKGROUND OF THE INVENTION

Nonwoven fabrics, fibrillated films, and other materials comprising polymeric fibers or fibrils have been utilized in a variety of filtration and/or air-masking type applications. For example, U.S. Pat. No. 5,709,735 to Midkiff et al. discloses the use of a nonwoven web for HVAC (heating, ventilating and air-conditioning) and other air filtration media. PCT Application Ser. No. US94/12699 (Publication No. WO95/13856) discloses high-loft multicomponent fiber webs suitable for use in a variety of air filtration applications. Additionally, U.S. Pat. No. 5,855,784 to Pike et al. discloses a variety of conjugate fiber nonwoven webs suitable for use as air and/or liquid filtration media. Further, multilayer laminates have likewise been used in a variety of filtration and/or filtration-like applications, see, for example, U.S. Pat. No. 5,721,180 to Pike et al. and U.S. Pat. No. 4,041,203 to Brock et al.

Filtration materials desirably exhibit the highest filtration efficiency at the lowest possible pressure drop. In this regard, the filtration efficiencies of many filters can be improved, without a corresponding increase in pressure drop, by electrostatically charging the materials in order to impart a charge to the filter media. The use of electrets for filtration applications has been known for some time. The advantage of materials of this type is that the charge on the fibers considerably augments the filtration efficiency without making any contribution to the airflow resistance. Air filtration efficiency varies with the electrostatic charge; however, it is not a direct measure of the quantity or magnitude of charge in the media.

It is known that certain materials can be permanently electrostatically polarized, such as by heating the material, applying a high-voltage electric field, and cooling the material while under the influence of the electric field. A dielectric becomes an electret when the rate of decay of the field-induced polarization can be slowed down so much that a significant fraction of the polarization is preserved long after the polarizing field has been removed. Such electrets can be made by various methods, e.g. corona charging, triboelectric charging (friction) and so forth. Methods of treating various materials to impart an electrostatic charge are described in U.S. Pat. No. 4,215,682 to Kubic et al., U.S. Pat. No. 4,375,718 to Wadsworth et al., U.S. Pat. No. 4,588,537 to Klaase et al. and U.S. Pat. No. 5,401,446 to Tsai et al. However, the ability to impart an electrostatic charge or field of sufficient initial strength and/or maintaining a desired level of electrostatic charge over time has proven difficult for many materials and, in particular, non-polar materials such as polyolefin fabrics. Moreover, many thermoplastic polymer materials often experience a significant or accelerated degradation in the level of electrostatic charge upon exposure to heat and/or moisture. In this regard, many filtration materials are exposed to heat and/or moisture such as, for example, HVAC filtration media, sterilization wraps, vacuum bag liners, face masks and so forth.

In an effort to improve the electrostatic charge within an electret, various topical treatments have been used as a means to improve the stability of such electrostatic charges. In addition, electret nonwoven webs of non-polar polymeric materials have been provided which introduce polar groups onto side-chains and/or the backbone of the non-polar monomer or otherwise grafting unsaturated carboxylic acids thereon such as, for example, as described in U.S. Pat. No. 5,409,766 to Yuasa et al. Further, U.S. Pat. No. 4,626,263 to Inoue et al. discloses an electret treated film comprising a non-polar polymer and a non-polar polymer modified by grafting or copolymerization with a carboxylic acid, epoxy monomer or silane monomer. In addition, PCT Application US97/08482 (Publication No. WO97/44509) discloses the addition of ferroelectric particles within melt extruded thermoplastic materials in order to increase the level of electric fields imparted to the material by methods such as electric or corona polarization.

Although the above methods can provide a thermoplastic polymer material having improved levels of electrostatic charge, there still exists a need for polymeric materials having high levels of electrostatic charge. Further, there exists a need for such highly charged materials that are capable of substantially maintaining its initial charge over time. Still further, there exists a need for such a material that is capable of maintaining a substantial percent of its initial charge upon exposure to heat and/or moisture.

SUMMARY OF THE INVENTION

The present invention provides an improved electret material having locally large electric fields which are more stable than those of comparable pre-existing electret materials. Accordingly, the filtration efficiency of porous materials of the present invention are thus enhanced and furthermore, the increased filtration efficiency can be better maintained over time as well as upon exposure to heat and/or moisture. Thus, the problems experienced by those skilled in the art are overcome by the present invention which, in one aspect, comprises a porous electret sheet formed from a composite material comprising a polymeric matrix and a ferroelectric material dispersed therein and wherein the polymeric matrix comprises (i) a first thermoplastic polymer component and (ii) a second thermoplastic polymer having one or more polar functional groups. In a further aspect, the second thermoplastic polymer can comprise a telomer. In still a further aspect, the second thermoplastic polymer can comprise a non-polar polymer randomly modified to include polar functional groups or a copolymer of two or more ethylinically unsaturated monomers, wherein one or more of the monomers possesses a polar functional group. In one embodiment, the first thermoplastic polymer component desirably comprises between about 45 and about 99.9% by weight of the composite, the second thermoplastic polymer desirably comprises from about 0.1 to about 25% by weight of the composite, and the ferroelectric component desirably comprises from about 0.01% to about 30% by weight of the composite. In still a further aspect, the first thermoplastic polymer component can comprise a semi-crystalline polyolefin. Additionally, the polymeric matrix can comprise a substantially homogeneous blend or mixture of a polyolefin and a telomer. In still a further aspect of the present invention, the porous sheet can comprise a nonwoven web of thermoplastic polymer fibers having a substantially permanent or stabilized charge contained therein.

DESCRIPTION OF THE INVENTION

Figure 1:
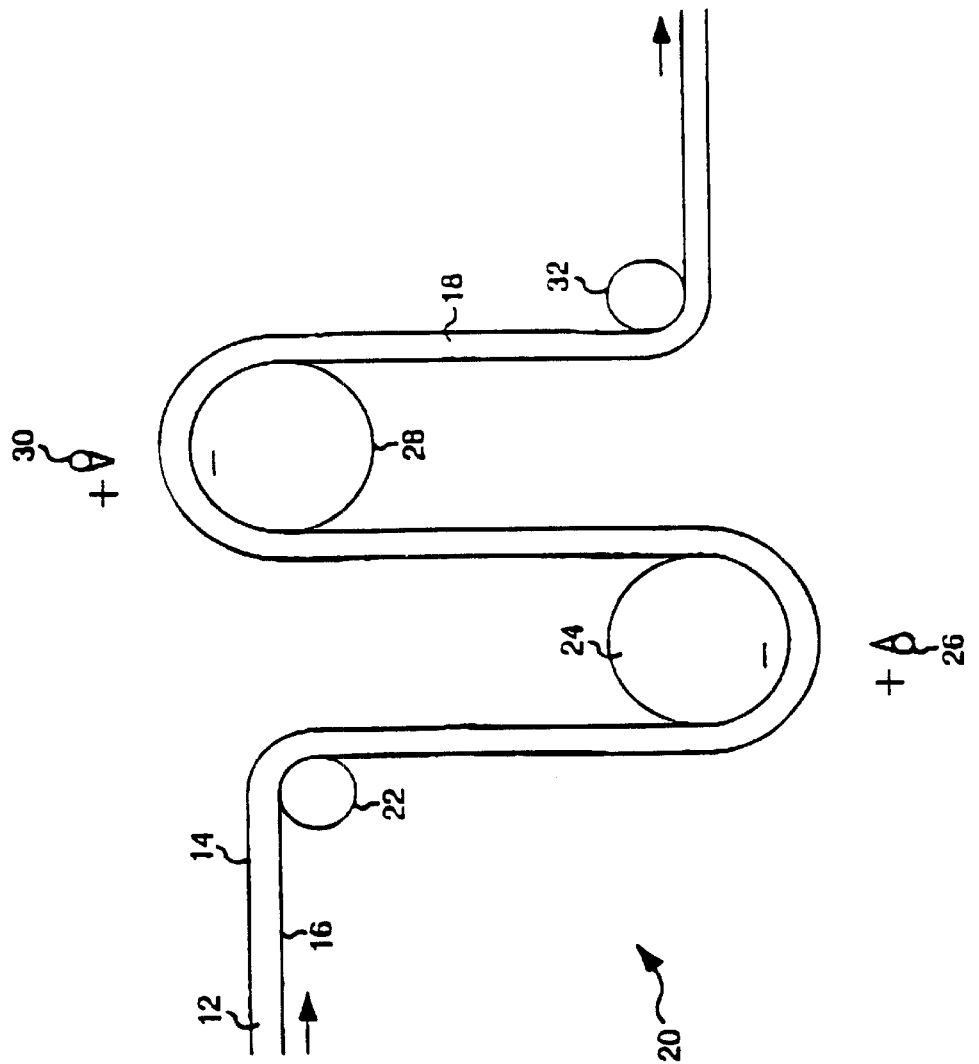
FIG. 1 is a schematic diagram of a process line for electret treating polymeric materials.

Polymeric electret materials or articles of the present invention comprise a composite which includes a polymeric matrix and a ferroelectric material distributed therein. As used herein a "polymeric matrix" means a surrounding or pervading element within which additional material or materials (e.g. ferroelectric material) is contained. The polymeric matrix can comprise (a) a first thermoplastic polymer component and (b) a second thermoplastic polymer component comprising a polymer having one or more polar functional groups. The polymeric composite is formed into a porous material or sheet as desired. As used herein, the term "sheet" is used in the broadest sense and includes, without limitation, films, foams, woven fabrics, nonwoven webs and so forth. The composite is treated to impart a permanent or substantially permanent electrostatic charge thereto. The porous material or sheet thus exhibits localized, stable electric fields and is an electret or electret material.

The first thermoplastic polymer component desirably comprises a major portion of the polymeric matrix. Suitable thermoplastic polymers include, but are not limited to, polyolefins (e.g., polypropylene and polyethylene), polycondensates (e.g., polyamides, polyesters, polycarbonates, and polyarylates), polyols, polydienes, polyurethanes, polyethers, polyacrylates, polyacetals, polyimides, cellulose esters, polystyrenes, fluoropolymers, and polyphenylene-sulfide and so forth. As used herein and throughout the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible spatial or geometrical configurations of the molecule. These configurations include, but are not limited to isotactic, syndiotactic and random symmetries. Desirably, the first thermoplastic polymeric component comprises a non-polar polymer such as a polyolefin and, still more desirably, polyethylene, polypropylene, poly(1-butene), poly(2-butene), poly(1-pentene), poly(2-pentene), poly(1-methyl-1-pentene), poly(3-methyl-1-pentene), and poly(4-methyl-1-pentene) and so forth. The first thermoplastic polymer component can also comprise a blend or mixture of two or more polymers. As an example, the major component of the polymeric matrix can comprise polymer blends and, preferably, polyolefin polymer blends such as, for example, polypropylene/poly-1-methyl pentene blends and the polypropylene/polybutylene blends described in U.S. Pat. No. 5,165,979 to Watkins et al. and U.S. Pat. No. 5,204,174 to DaPonte et al.

The polymeric matrix also comprises a second thermoplastic polymer component which has one or more polar functional units or groups. Preferably the thermoplastic polymer of the second polymeric component comprises a telomer or telechelic polymer. As used herein "telechelic" polymer or "telomer" comprise polymers having one or more functional groups located at the chain ends of the polymer. The telomer can be a homopolymer, copolymer, terpolymer or other composition. However, with copolymers or other polymers with a plurality of repeat units, the terminal or end functional groups of the telomers do not have the same chemical functionality as the repeat units. Telomers can have either one or a plurality of functional end groups and the average number of functional end groups for a given telomer will vary with the method of formation, degree of chain branching and other factors known to those skilled in the art. The telomer is desirably present in an amount of from about 0.1% to about 25% of the total weight of the composite and even more desirably comprises from about 0.5% to about 15% of the composite and still more desirably comprises from about 1% to about 10% of the composite. In a further aspect of the invention, the functional end groups desirably comprise a weight percent of between about 0.0004% and about 0.2% and even more desirably between 0.002% and 0.1% by weight of the total polymeric portion of the composite. In addition, the second thermoplastic polymer component can comprise one or more distinct polymers.

The telomer and/or other polymers used in combination with the host polymers are desirably compatible or substantially compatible with the first thermoplastic polymer component. As used herein "substantially compatible" means mixtures or blends of polymers wherein the composition produces a single DSC melting curve (determined by evaluating a composition by differential scanning calorimetry (DSC)) which is indicative of sufficient compatibility or miscibility to avoid formation of substantially discrete domains within the continuous phase of the host polymer. Desirably, the telomer has a chain or backbone which is substantially similar to that of the host polymer and even more desirably identical to that of the host polymers. The functional end groups are desirably end groups capable of hydrogen bonding or undergoing a reaction, such as a condensation reaction, to form a covalent bond. Generally, polar functional groups are desirable such as, for example, an aldehyde, acid halide, acid anhydrides, carboxylic acids, amines, amine salts, amides, sulfonic acid amides, sulfonic acid and salts thereof, thiols, epoxides, alcohols, acyl halides, and derivatives thereof. Particularly preferred telomers include, but are not limited to, acid anhydride, carboxylic acid, amides, amines, and derivatives thereof.

Telomers and telechelic polymers are known in the art and various telomers and methods of making the same are described in Encyclopedia of *Polymer Science and Engineering*, vol. 16, pg. 494–554 (1989); the particular method utilized in making the telomer is not believed critical to practicing the present invention. As an example, telomers can be made by reactive grafting. In this regard, the desired polymer chains can be broken by peroxide cracking in the presence of the selected functional end group monomer. Peroxide cracking generates a free radical chain end that reacts with the functional groups and which thereby becomes the terminal or end group of the polymer chain. As particular examples, polyolefin-anhydride telomers (a polyolefin polymer having one or more anhydride end groups) suitable for use with the present invention are commercially available from Exxon Chemical Company of Houston, Tex. under the trade name EXXELOR and from Uniroyal Chemical Company under the trade name POLYBOND.

The desired polymer composition and rheology will be selected in accord with the particular manufacturing process of the polymeric material. The telomer desirably has a melt-flow rate (MFR) and/or melt-index (MI) which is compatible with the selected formation process. By utilizing a telomer with similar rheological properties, such as MI or MFR, it is believed a more homogeneous blend can be produced and processing will generally be improved. However, the criticality in matching melt-flow rates or using telomers with specific properties will vary with the particular process employed. As an example, with respect to bicomponent spunbond fiber formation, desirably the telomer has an MI at least equal to that of the first thermoplastic polymer and even more desirably has an MI greater than that of the first thermoplastic polymer in order to improve spinning and fiber formation. However, with meltblown fiber formation the telomer can have an MFR below that of the host polymer.

As further examples, it is believed the second thermoplastic polymer component can also comprise random or block copolymers of two or more ethylinically unsaturated monomers, wherein one or more of the monomers possesses a polar functional group. As a particular example, the polar thermoplastic polymer can comprise copolymers of an olefin and a polar repeat unit such as, for example, copolymers of ethylene/acrylic acid as described in U.S. Pat. No. 5,817,415 to Chou. In addition, it is believed the second thermoplastic polymer component can comprise a non-polar polymer modified to include a polar functional group such as, for example, a polyolefin polymer randomly grafted to include a polar functional group. As particular examples, the second polyolefin polymer can comprise a polypropylene polymer backbone randomly grafted with a carboxylic acid as described in U.S. Pat. No. 4,626,263 to Inoue et al. and U.S. Pat. No. 5,409,766 to Yuasa et al. Copolymers or backbone grafted polymers, such as those described immediately above, tend to be incompatible with the first thermoplastic polymer due to the size and chemical nature of the functional groups positioned along the polymer backbone. Thus, grafted polymers of this type can form discrete phases or regions and are likened to biconstituent polymers which do not have a single or substantially homogeneous phase and instead usually form fibrils or protofibrils which start and end at random. Thus, the polymeric matrix may itself comprise a multi-phase material having discrete domains of the second polymer component distributed within a continuous phase of the first thermoplastic polymer component. Desirably, however, the polymeric matrix comprises a homogenous or substantially homogenous phase as can be achieved by substantially compatible first and second polymers.

The second thermoplastic polymer component is desirably blended with the first thermoplastic polymer component in a manner designed to achieve a substantially homogeneous mixture or blend. As one example, the polymers can be blended using a master batch or dry blend technique. In this regard, the respective polymers are initially blended to form a master batch, typically in the form of pellets, prills or powder, having a higher weight percent of the second thermoplastic polymer component than ultimately desired in the polymeric matrix. The master batch is then mixed with pellets comprising the first thermoplastic polymer component and processed through a single-screw or multi-screw extruder. The ratio of the master batch and first thermoplastic polymer component is selected, based upon the weight percent of second thermoplastic polymer in the master batch, to achieve the desired ratio of first and second polymers. Other blending techniques are also believed suitable for use with the present invention.

The particular composition of each of the components of the polymeric matrix will vary with respect to the chosen process for making the porous substrate or sheet. As an example, the desired polymer rheology is different for those used for making films as opposed to fibers and further, with respect to fiber forming processes, the desired polymer composition and rheology differs for polymers used for making spunbond fibers and those for making meltblown fibers. The desired polymer composition and/or rheology for a particular manufacturing process are known to those skilled in the art.

In addition, the polymeric composite also comprises a ferroelectric material. The term "ferroelectric material" is used herein to mean a crystalline material which possesses a spontaneous polarization which may be reoriented by the application of an external electric field. The term includes any phase or combination of phases exhibiting a spontaneous polarization, the magnitude and orientation of which can be altered as a function of temperature and externally applied electric fields. The term also is meant to include a single ferroelectric material and mixtures of two or more ferroelectric materials of the same class or of different classes. The term further includes a "doped" ferroelectric material, i.e., a ferroelectric material which contains minor amounts of elemental substituents, as well as solid solutions of such substituents in the host ferroelectric material. Ferroelectric materials exhibit a "Curie point" or "Curie temperature," which refers to a critical temperature above which the spontaneous polarization vanishes. The Curie temperature often is indicated herein as "$T_c$".

Examples of ferroelectric materials include, without limitation, perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, colemanite, and thiourea. Thus, ferroelectric materials may be inorganic or organic in nature. Inorganic ferroelectric materials are desired because of their generally superior thermal stability. Examples of various exemplary ferroelectric materials are discussed below.

Perovskites are a particularly desirable ferroelectric material due to their ability to form a wide variety of solid solutions from simple binary and ternary solutions to very complex multicomponent solutions. Some examples include, but are not limited to, $BaSrTiO_3$, $BaTiO_3$, $Pb(Co_{0.25}Mn_{0.25}W_{0.5})O_3$, and numerous forms of barium titanate and lead titanate doped with niobium oxide, antimony oxide, and lanthanum oxide, to name a few by way of illustration only. The ability to form extensive solid solutions of perovskite-type compounds allows one skilled in the art to systematically alter the electrical properties of the material by formation of a solid solution or addition of a dopant phase. In addition, perovskite-related octahedral structures have a structure similar to that of perovskites, and are likewise exemplary ferroelectric materials, examples include, but are not limited to, lithium niobate ($LiNbO_3$) and lithium tantalate ($LiTaO_3$). These materials are intended to be included in the term "perovskites." Additionally, a further example of ferroelectric materials include bismuth oxide layered materials which comprise complex layered structures of perovskite layers interleaved with bismuth oxide layers. An exemplary bismuth oxide layered compound is lead bismuth niobate ($PbBiNb_2O_9$). A more detailed description of suitable ferroelectric materials is provided in commonly assigned U.S. patent application Ser. No. 08/762,203 filed Dec. 6, 1996 to Turkevich et al., the entire contents of which are incorporated herein by reference.

The amount of ferroelectric material contained in the composite material is preferably within the range of from about 0.01 to about 50 percent by weight of the composite. Desirably, the amount of ferroelectric material within the composite is between about 0.05 to about 30 percent by weight and more desirably between about 0.1 to about 20 percent by weight of the composite and, still more desirably, between about 0.5 to about 5 percent by weight of the composite. On a percent by volume basis, the amount of ferroelectric material present in the composite generally will be in a range of from about 0.001 to about 13 percent by volume and desirably from about 0.01 to about 8 percent by volume and more desirably from about 0.1 to about 5 percent by volume and still more desirably from about 0.1 to about 2 percent by volume of the composite. Desirably the ferroelectric material is dispersed within the composite or matrix as described herein below.

The composite comprises a polymeric matrix with the ferroelectric material dispersed therein. The ferroelectric material can be located randomly throughout the polymeric matrix and, desirably, is substantially uniformly distributed throughout the polymeric matrix. In this regard, the composite desirably comprises a zero/three composite. As used herein a "zero/three" composite refers to the dimensional connectivity of the ferroelectric material and the polymer comprising the composite. Connectivity is a macroscopic measure of the composite structure which considers the individual structures (i.e. the ferroelectric material and the polymer) continuity in the x, y, and z dimensions. The first number refers to continuity of the ferroelectric material within the composite and a zero rating indicates that the ferroelectric particles form discrete phases which are discontinuous in the x, y and z dimensions. The second number refers to the continuity of the polymeric portion of the composite and a three rating indicates that the polymeric portion of the composite is continuous in each of the x, y and z dimensions.

In addition, the desired particle size of the ferroelectric material will vary with respect to the particular manufacturing process (e.g. meltblown, spunbond, film and so forth) as well as the desired physical attributes of the article made therefrom. For example, with respect to melt extruded fibers or filaments, the longest dimension of the particles typically should be no greater than about 50 percent of the diameter of the orifice through which the composite is extruded. Desirably, the ferroelectric material has a longest dimension in a range of from about 10 nanometers to about 10 micrometers. It has been found that many nonwoven fiber forming processes inherently orient the ferroelectric particle such that the longest dimension of the particle is oriented substantially parallel with the machine direction of the fabric (i.e. the direction in which the fabric is produced) and thus a wide range of particle sizes are suitable for use in such materials. The longest dimension of the average ferroelectric particle is desirably less than about 2 micrometers and/or desirably less than about 50% of the fiber thickness. In addition, the ferroelectric material can comprise nano-size particles. Suitable ferroelectric materials can be synthesized to form particles of the desired size and/or can be destructured to form particles of the desired size. The term "destructured" and variations thereof means a reduction in size of the ferroelectric particles.

The composite can be formed and processed by one of various methods. As an example, the composite material may be formed by the following process: (i) destructuring the ferroelectric material in the presence of a liquid and a surfactant to give destructured particles, wherein the liquid is a solvent for the surfactant and the surfactant is chosen to stabilize the destructured particles against agglomeration; (ii) forming a composite of the stabilized, destructured ferroelectric material particles and polymeric components; and (iii) extruding the composite material to form fibers, film or other materials as desired. A mixture of the stabilized, destructured ferroelectric material particles and a thermoplastic polymer may be prepared by a variety of methods. As specific examples, methods of making such materials are described in U.S. Pat. No. 5,800,866 to Myers et al. and European Patent Application No. 0902851-A1.

The individual components of the composite can be processed by one of various means to form the desired structure including, but not limited to, melt extrusion, solution spinning, gel spinning, extrusion cast films, blown films, and so forth. Desirably, the composite is made into a porous substrate or sheet. Examples of suitable polymeric materials or media include, but are not limited to, striated or fibrillated films, woven fabrics, reticulated foams, nonwoven webs, sintered porous materials and the like. Various nonwoven webs and laminates thereof, such as those described below, are particularly well suited for use as filtration materials and wipes. As used herein the term "nonwoven" fabric or web means a web having a structure of individual fibers or threads which are interlaid, but not in an identifiable manner as in a knitted fabric. Nonwoven fabrics or webs can be formed by many processes such as for example, meltblowing processes, spunbonding processes, hydroentangling, air-laid and bonded carded web processes. Fibers forming the webs or fabrics can have geometric, non-geometric and/or irregular shapes.

As a specific example, meltblown fiber webs have been used in various filtration and air masking articles. Meltblown fibers are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Meltblown processes are disclosed, for example, in U.S. Pat. No. 3,849,241 to Butin et al., U.S. Pat. No. 5,271,883 to Timmons et al.; U.S. Pat. No. 3,959,421 to Weber et al., U.S. Pat. No. 5,652,048 to Haynes et al., U.S. Pat. No. 4,100,324 to Anderson et al., and U.S. Pat. No. 5,350,624 to Georger et al.; the entire content of the aforesaid patents are incorporated herein by reference. Optionally, the nonwoven web can be cooled immediately following extrusion or formation upon forming surface. Meltblown fiber webs having a basis weight from about 14–170 grams per square meter ($g/m^2$) and even more desirably between about 17 $g/m^2$ and about 136 $g/m^2$ are particularly well suited for use as filtration media. Additionally, meltblown fiber webs having small average fiber diameter and pore size, such as those described in U.S. Pat. No. 5,721,883 to Timmons et al., are particularly well suited for use in filtration applications.

In addition, various spunbond fiber webs are also capable of providing good filtration or air-masking media. Methods of making suitable spunbond fiber webs include, but are not limited to, U.S. Pat. No. 4,340,563 to Appel et al., U.S. Pat. No. 3,802,817 to Matsuki et al., and U.S. Pat. No. 5,382,400 to Pike et al. Spunbond fiber webs particularly well suited for use as filtration media are described in U.S. Pat. No. 5,709,735 to Midkiff et al., U.S. Pat. No. 5,597,645 to Pike et al., U.S. Pat. No. 5,855,784 to Pike et al., PCT Application Ser. No. US94/12699 (Publication No. WO95/13856) and PCT Application Ser. No. US96/19852 (Publication No. WO97/23246); the entire content of the aforesaid references are incorporated herein by reference. With respect to multicomponent fibers, the composite material can comprise either one or more components within the fiber. Spunbond fiber webs suitable for use with the present invention desirably have a basis weight between about 14 $g/m^2$ and about 170 $g/m^2$ and more desirably between about 17 $g/m^2$ and about 136 $g/m^2$.

Staple fiber webs, such as air-laid or bonded/carded webs, are also suitable for formation of polymeric electret materials of the present invention. An exemplary staple fiber web is described in U.S. Pat. No. 4,315,881 to Nakajima et al.; the entire content of which is incorporated herein by reference. Staple fibers comprising the telomer polymer blend can comprise a portion of or all of the staple fibers within the staple fiber web. As still further examples, additional polymeric media suitable for use with the present invention include multilayer laminates. As used herein "multilayer nonwoven laminate" means a laminate comprising one or more nonwoven layers such as, for example, wherein at least one of the layers is a spunbond fiber web and/or at least one of the layers is a meltblown fiber web. As a particular example, an exemplary multilayer nonwoven laminate comprises a spunbond/meltblown/spunbond (SMS) laminate. Such a laminate may be made by sequentially depositing onto a moving forming belt a first spunbond fabric layer, then a meltblown fabric layer and a second spunbond layer. The multiple layers can then be bonded, such as by thermal point bonding, to form a cohesive laminate. Alternatively, one or more of the fabric layers may be made individually, collected in rolls, and combined in a separate bonding step. Examples of multilayer nonwoven laminates are disclosed in U.S. Pat. No. 5,721,180 to Pike et al., U.S. Pat. No. 4,041,203 to Brock et al., U.S. Pat No. 5,188,885 to Timmons et al. and U.S. Pat. No. 5,482,765 to Bradley et al.; the entire contents of which are incorporated herein by reference. The composite can comprise fibers in one or more of the layers of a multilayer laminate. Other media suitable for use with the present invention include, by way of further examples, filtration media described in U.S. Pat. No. 4,588,537 and RE 32,171.

The composite material is desirably treated to become electrostatically polarized, i.e. to exhibit an electrostatic charge or field and thereby comprise an electret. In this regard it is noted that electrostatically charging the material can improve the filter efficiency of the material. Various electret treatment techniques are known in the art and it is not believed that the method of electret treatment of the media is critical to the present invention and that numerous methods of electret treatment are suitable for use with the present invention. Suitable electret treating processes include, but are not limited to, plasma-contact, electron beam, corona discharge and so forth. Electrical or corona poled treatments can be applied either during and/or after the film formation or fiber spinning process. As examples thereof, methods for treating materials to form electrets are disclosed in U.S. Pat. No. 4,215,682 to Kubic et al., U.S. Pat. No. 4,375,718 to Wadsworth et al., U.S. Pat. No. 4,588,537 to Klaase et al., U.S. Pat. No. 4,592,815 to Makao, and U.S. Pat. No. 5,401,446 to Tsai et al.; the entire contents of the aforesaid patents are incorporated herein by reference.

As one example, a filter or air-masking media can be charged or electretized by sequentially subjecting the material, such as a nonwoven web, to a series of electric fields such that adjacent electret fields have opposite polarities with respect to one another. For example, a first side of the web is initially subjected to a positive charge while the second or opposed side is subjected to a negative charge, and then the first side is subjected to a negative charge and the second side to a positive charge thereby imparting permanent electrostatic charges in the material. A suitable method of electrostatically polarizing a polymeric material such as a nonwoven web is illustrated in FIG. 1. Polymeric sheet 12, having first side 14 and second side 16, is received by electret treatment apparatus 20. Polymeric sheet 12 is directed into apparatus 20 with second side 16 in contact with guiding roller 22. First side 14 of sheet 12 comes in contact with first charging drum 24, having a negative electrical potential, while second side 16 of sheet 12 is adjacent first charging electrode 26, having a positive electrical potential. As sheet 12 passes between first charging drum 24 and first charging electrode 26, electrostatic charges develop therein. The polymeric sheet 12 is then passed between second charging drum 28 and second charging electrode 30. Second side 16 of sheet 12 comes in contact with second charging drum 28, having a negative electrical potential, while first side 14 of sheet 12 is adjacent second charging electrode 30, having a positive electrical potential. The second treatment reverses the polarity of the electrostatic charges previously imparted within the web and creates a permanent electrostatic charge therein. The polarities of the charging drums and electrodes could be reversed. The electretized sheet 18 can then be passed to second guiding roller 32 and removed from electret treatment apparatus 20. Additionally, other devices or apparatus could be utilized in lieu of those discussed in reference to FIG. 1.

Electret materials of the present invention can be used to make a variety of products and/or articles. As used herein the term "filtration" or "filter" media can refer to fabrics which provide a desired level of barrier properties and is not limited to the strict or narrow definition of a filter which requires entrapment of particles. Thus, filter media of the present invention can be used in air and gas filtration media such as, for example, those used in HVAC filters, vacuum cleaner bags, respirators, air filters for engines, air filters for cabin air filtration, heating and/or air conditioner filters, and so forth. Additionally, the filter media of the present invention can also be utilized in infection control products such as, for example, medically oriented items such as face masks, wound dressings, sterilization wraps and the like. As a particular example, exemplary sterilization wraps and face masks are described in U.S. Pat. No. 4,969,457 to Hubbard et al., U.S. Pat. No. 5,649,925 to Reese et al., and U.S. Pat. No. 5,635,134 to Bourne et al., the entire contents of the aforesaid references are incorporated herein by reference. Further, electret filter media can be utilized in hand wipes and other similar applications. In this regard, the electret media can be particularly adept at picking up lint, dust and other fine particulate matter. Polymeric electret materials can comprise or be incorporated as a component within in a wide variety of articles.

In a further aspect of the invention, improved porous electret materials can comprise a blend of (a) a first thermoplastic polymer and (b) a second thermoplastic comprising a telomer which is compatible with the first thermoplastic polymer. The telomer is desirably present in an amount of from about 0.1% to about 25% of the total weight of the polymeric portion of the material and even more desirably comprises from about 0.5% to about 15%. In a preferred embodiment, the polymeric electret material comprises from about 90% to about 99% of a first thermoplastic polymer and from about 1% to about 10% of a telomer. In a further aspect of the invention, the functional end groups desirably comprise between about 0.0004% and about 0.2% by weight and even more desirably between 0.002% and 0.1% by weight of the blend. Desirably, the first thermoplastic polymer comprises a non-polar polymer and the telomer has a chain or backbone which is substantially similar and/or identical to that of the first thermoplastic polymer. In one embodiment, the first thermoplastic polymer can comprise a polyolefin polymer and the second thermoplastic polymer can comprise a compatible polyolefin telomer. As a specific example, the first thermoplastic polymer can comprise a polymer comprising a significant fraction of propylene repeat units and the second polymer comprises a compatible telomer that comprises a significant fraction of propylene repeat units. These polymer blends can be used with or without addition of ferroelectric materials and are also suitable for use in the materials and processes described herein above.

Tests

Electret materials of the present invention can be used to make a variety of products and/or articles. As used herein the term "filtration" or "filter" media can refer to fabrics which provide a desired level of barrier properties and is not limited to the strict or narrow definition of a filter which requires entrapment of particles. Thus, filter media of the present invention can be used in air and gas filtration media such as, for example, those used in HVAC filters, vacuum cleaner bags, respirators, air filters for engines, air filters for cabin air filtration, heating and/or air conditioner filters, and so forth. Additionally, the filter media of the present invention can also be utilized in infection control products such as, for example, medically oriented items such as face masks, wound dressings, sterilization wraps and the like. As a particular example, exemplary sterilization wraps and face masks are described in U.S. Pat. No. 4,969,457 to Hubbard et al., U.S. Pat. No. 5,649,925 to Reese et al., and U.S. Pat. No. 5,635,134 to Bourne et al., the entire contents of the aforesaid references are incorporated herein by reference. Further, electret filter media can be utilized in hand wipes and other similar applications. In this regard, the electret media can be particularly adept at picking up lint, dust and other fine particulate matter. Polymeric electret materials can-comprise or be incorporated as a component within in a wide variety of articles.

EXAMPLES

The examples discussed herein below with regard to Examples 1–3 were made and/or treated as follows. The microcomposites (i.e. polymeric matrix and ferroelectric particles) discussed in the following examples were made using a 20%, by weight, barium titanate/polypropylene concentrate, and were prepared by conventional dry blending and melt compounding techniques. Preparation of the barium titanate/polypropylene concentrate was carried out in accordance with U. S. Pat. No. 5,800,866 to Myers et al., the entire contents of which is incorporated herein by reference. The polypropylene/telomer blends were likewise prepared by conventional dry blending and melt compounding techniques. The polymers, polymer blends and/or microcomposites were made into meltblown fiber webs using conventional meltblowing equipment. The basis weights of the respective materials were varied by altering line speeds. The meltblown fabrics were electret treated on-line in accord with U.S. Pat. No. 5,401,446 to Tsai et al., the entire contents of which is incorporated herein by reference. The electret treatment conditions were maintained constant for all materials.

Example 1

Example 1A (comparative): the meltblown fibers consisted of 100% by weight polypropylene (PROFAX PF-015 available from Montel Polymers of Wilmington, Del.);

Example 1B (comparative): the meltblown fibers consisted of a microcomposite of 99% by weight polypropylene (PROFAX PF-015 available from Montel Polymers of Wilmington, DE) and 1% by weight $BaTiO_3$ (TICON 5016 Barium Titanate available from TAM Ceramics of Niagara Falls, N.Y.);

Example 1C: the meltblown fibers consisted of a microcomposite of 98% by weight polypropylene (PROFAX PF-015 available from Montel Polymers of Wilmington, Del.), 1% by weight maleic anhydride telomer (EXXELOR PO 1015 available from Exxon Chemical Company of Houston, Tex.) and 1% by weight $BaTiO_3$ (TICON 5016 Barium Titanate available from TAM Ceramics of Niagara Falls, N.Y.);

Example 1D: the meltblown fibers consisted of a microcomposite of 98% by weight polypropylene (PROFAX PF-015 available from Montel Polymers of Wilmington, Del.), 1% by weight maleic anhydride telomer (POLYBOND 3200 available from Uniroyal Chemical Company, Middlebury, Conn.) and 1% by weight $BaTiO_3$ (TICON 5016 Barium Titanate available from TAM Ceramics of Niagara Falls, N.Y.).

The air filtration efficiencies for the meltblown nonwoven webs prepared from examples 1A–1D are set forth in Tables 1A–1D. Filtration media were evaluated at the time of manufacture and then again approximately 1 month later. The materials were all aged on rolls in a humidity and temperature controlled laboratory environment (relative humidity ca. 40%, and temperature ca. 25° C.).

TABLE 1A

Filter Penetrations for Example 1A

| Basis Weight (osy) | Initial Penetration (%) | 1 Month Aged Penetration (%) | Percent Change (%) |
|---|---|---|---|
| 0.5 | 23.8 ± 1 | 31.5 ± 2 | 32 |
| 1.0 | 5.2 ± 0.3 | 8.5 ± 0.9 | 63 |
| 1.5 | 3.7 ± 0.2 | 5.74 ± 0.8 | 56 |

Percent Change = [(Initial Penetration − Aged Penetration)/ Initial Penetration] × 100%.

TABLE 1B

Filter Penetrations for Example 1B

| Basis Weight (osy) | Initial Penetration (%) | 1 Month Aged Penetration (%) | Percent Change (%) |
|---|---|---|---|
| 0.5 | 22.1 ± 1 | 26.8 ± 2 | 21 |
| 1.0 | 4.1 ± 0.2 | 4.5 ± 0.3 | 9.8 |
| 1.5 | 3.5 ± 0.2 | 3.7 ± 0.3 | 4.8 |

TABLE 1C

Filter Penetrations for Example 1C

| Basis Weight (osy) | Initial Penetration (%) | 1 Month Aged Penetration (%) | Percent Change (%) |
|---|---|---|---|
| 0.5 | 19.2 ± 0.6 | 19.0 ± 1 | 1 |
| 1.0 | 3.5 ± 0.2 | 3.7 ± 0.2 | 5.7 |
| 1.5 | 2.3 ± 0.2 | 2.3 ± 0.1 | <1 |

TABLE 1D

Filter Penetrations for Example 1D

| Basis Weight (osy) | Initial Penetration (%) | 1 Month Aged Penetration (%) | Percent Change (%) |
|---|---|---|---|
| 0.5 | 19.2 ± 0.6 | 20.1 ± 1 | 4.7 |
| 1.0 | 4.2 ± 0.2 | 4.2 ± 0.3 | <1 |
| 1.5 | 2.5 ± 0.3 | 2.7 ± 0.3 | 8 |

Notably, the meltblown filter media prepared from 100% polypropylene, Example 1A, experienced a significant increase in filter penetration (i.e. loss of efficiency) after only one month of aging. Aged media penetrations increased from 30 to 60% over the one month storage period. The microcomposite fiber media, Example 1B, containing 1% barium titanate shows an improvement over this performance, especially at the two higher basis weights. However, the addition of 1% by weight of telomer and 1% by weight barium titanate, Examples 1C and 1D, substantially arrests the loss of filtration efficiency resulting from aging and also yields filter media with lower initial penetrations.

Example 2

Example 2A: the meltblown fibers consisted of a microcomposite of 99% by weight polypropylene (Fina EOD97-18 available from Fina Oil and Chemical Company of Deer Park, Tex.) and 1% by weight $BaTiO_3$ (TICON 5016 Barium Titanate available from TAM Ceramics of Niagara Falls, N.Y.);

Example 2B: the meltblown fibers consisted of a microcomposite of 98% by weight polypropylene (Fina EOD97-18 available from Fina Oil and Chemical Company of Deer Park, Tex.), 1% by weight maleic anhydride telomer (EXXELOR PO 1015 available from Exxon Chemical Company of Houston, Tex.) and 1% by weight $BaTiO_3$ (TICON 5016 Barium Titanate available from TAM Ceramics of Niagara Falls, N.Y.).

As evidenced by the data set forth in Tables 2A and 2B below, the microcomposite/telomer combination yields filter media with higher initial filtration efficiency and better resistance to efficiency loss due to aging effects. Microcomposite media of polypropylene/barium titanate experienced a 9% change in filtration efficiency over this time period, whereas media which combined both the barium titanate and telomer exhibited a 3% change in efficiency.

TABLE 2A

Filtration Efficiency for Example 2A

| Basis Weight | Time after Manufacture (days) | Filtration Efficiency (%) | Percent Change |
| --- | --- | --- | --- |
| 0.6 osy | 0 | 87.0 | — |
| 0.6 osy | 13 | 79.0 | 9.1 |

TABLE 2B

Filtration Efficiency for Example 2B

| Basis Weight | Time after Manufacture (days) | Filtration Efficiency (%) | Percent Change |
| --- | --- | --- | --- |
| 0.6 osy | 0 | 91.0 | — |
| 0.6 osy | 13 | 88.0 | 3.3 |

Percent change = [(Initial Efficiency - Final Efficiency)/Initial Efficiency] × 100

Example 3

Example 3A: the meltblown fibers consisted of a microcomposite of 91.3% by weight polypropylene (PROFAX PF-015 available from Montel Polymers of Wilmington, Del.), 5% by weight maleic anhydride telomer (EXXELOR PO 1015 available from Exxon Chemical Company of Houston, Tex.) and 3.7% by weight $BaTiO_3$ (TICON 5016 Barium Titanate available from TAM Ceramics of Niagara Falls, N.Y.);

Example 3B: the meltblown fibers consisted of a microcomposite of 91.3% by weight polypropylene (PROFAX PF-105 available from Montel Polymers of Wilmington, Del.), 5% by weight maleic anhydride telomer (POLYBOND 3200 available from Uniroyal Chemical Company, Middlebury, Conn.) and 3.7% by weight $BaTiO_3$ (TICON 5016 Barium Titanate available from TAM Ceramics of Niagara Falls, N.Y.).

The air filtration efficiencies for the meltblown nonwoven webs prepared from examples 3A and 3B shown are set forth in Tables 3A and 3B. Filtration media were evaluated at the time of manufacture and then again approximately 13 days later. The materials were all aged on rolls in a humidity and temperature controlled laboratory environment (relative humidity ca. 40%, and temperature ca. 25° C.). As evidenced by Tables 3A and 3B, the polypropylene meltblown fiber filtration media including 5% by weight telomer and 3.7% by weight barium titanate substantially arrests the loss of filtration efficiency as a result of aging and also yield filter media with excellent initial penetrations.

TABLE 3A

Filtration Efficiency for Example 3A

| Basis Weight | Time after Manufacture (days) | Filtration Efficiency (%) | Percent Change |
| --- | --- | --- | --- |
| 0.85 osy | 0 | 98.3 | — |
| 0.85 osy | 13 | 96.8 | 1.5 |
| 0.85 osy | 0 | 96.1 | — |
| 0.85 osy | 13 | 94.8 | 1.4 |

TABLE 3B

Filtration Efficiency for Example 3B

| Basis Weight | Time after Manufacture (days) | Filtration Efficiency (%) | Percent Change |
| --- | --- | --- | --- |
| 0.85 osy | 0 | 98.4 | — |
| 0.85 osy | 13 | 97.4 | 1 |
| 0.85 osy | 0 | 96.7 | — |
| 0.85 osy | 13 | 95.4 | 1.3 |

Example 4

Blends of a thermoplastic host polymer and a thermoplastic telomer were prepared by conventional melt compounding techniques. A blend was prepared by first dry blending pellets or prills of the thermoplastic host polymer with pellets or prills of the telomer. A 20 weight % masterbatch of the polypropylene-maleic anhydride telomer (EXXELOR PO 1015 from Exxon Chemical Company, Houston, Tex.) and polypropylene (Montel PROFAX PF-015 from Montel Polymers, Wilmington, Delaware) was prepared by tumble blending 20 lbs. of EXXELOR PO 1015 with 80 lbs. of Montel PROFAX PF-015. The dry blend was then melt compounded using a single screw compounding extruder. The 20 weight % melt compounded blend was pelletized and used in turn to melt compound a series of lower concentration telomer blends described below. The polymeric component of the control comprised 100% by weight polypropylene (Montel PROFAX PF-015).

Telomer/thermoplastic polymer blends were formed into nonwoven fabrics on a meltblowing line. Typically, the polypropylene-maleic anhydride telomer/polypropylene blends were meltblown to form nonwoven fabrics approximately 20 inches (about 51 cm) in width. Meltblowing conditions were maintained the same for all materials made during a particular production period. The line speed was varied to alter basis weight. Basis weights of 0.5 ounces per square yard or osy (about 17 g/m$^2$), 0.75 osy (about 25 g/m$^2$), 1.0 osy (about 34 g/m$^2$), and 1.5 osy (about 51 g/m$^2$) were spun from PROFAX PF-015 alone (the control) and from the 1 weight % and 10 weight% EXXELOR PO 1015 and PROFAX PF-015 blends. The nonwoven fabrics described above were electret treated on-line in accordance with the teachings of U.S. Pat. No. 5,401,446 to Tsai et. al.

Figure 2:
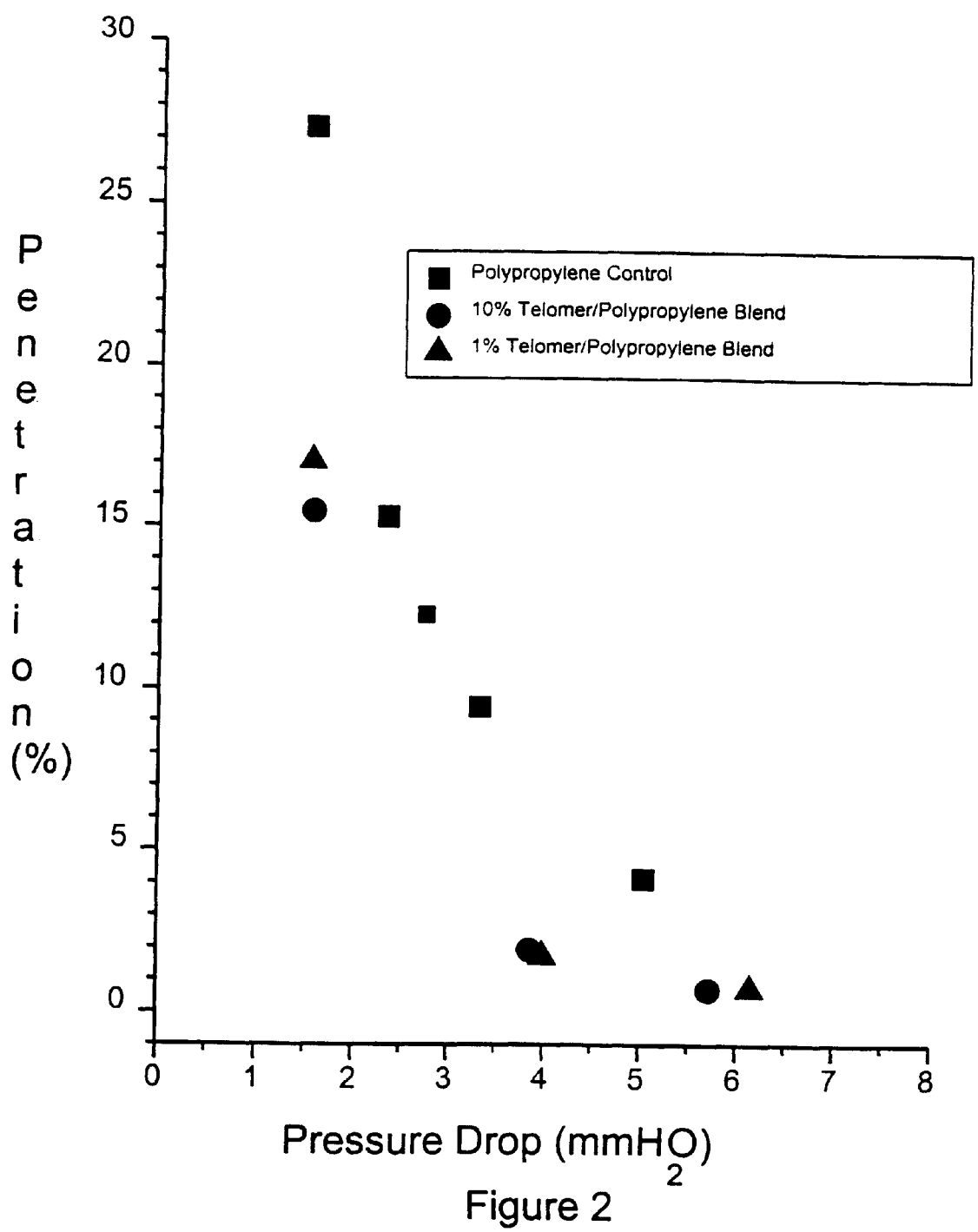
FIG. 2 is graph plotting percent penetration versus pressure drop of several electret meltblown fiber webs of the present invention.

The air filtration efficiencies for meltblown nonwoven webs prepared from PROFAX PF-015 polypropylene alone and the 1%, by weight, and 10%, by weight, blends of EXXELOR PO 1015 and PROFAX PF-015 are shown in Tables 4A, 4B, 4C and FIG. 2.

TABLE 4A

Air Filtration Results for Polypropylene Control Webs

| Basis Weight (osy) | Pressure Drop (mm HO) | Penetration (%) |
|---|---|---|
| 0.5 | 1.6 | 27.4 |
| 0.75 | 2.3 | 15.3 |
| 1.0 | 3.3 | 9.5 |
| 1.5 | 5.0 | 4.1 |

TABLE 4B

Air Filtration Results for 1 Weight % Telomer/Polypropylene Webs

| Basis Weight (osy) | Pressure Drop (mm H$_2$O) | Penetration (%) |
|---|---|---|
| 0.5 | 1.6 | 17.0 |
| 1.0 | 4.0 | 1.7 |
| 1.5 | 6.2 | 0.7 |

TABLE 4C

Air Filtration Results for 10 Weight % Telomer/Polypropylene Webs

| Basis Weight (osy) | Pressure Drop (mm H$_2$O) | Penetration (%) |
|---|---|---|
| 0.5 | 1.6 | 15.5 |
| 1.0 | 3.9 | 1.9 |
| 1.5 | 5.7 | 0.7 |

The data of Tables 4A, 4B and 4C illustrate that the addition of the telomer significantly improves the initial air filtration efficiency of electret treated meltblown webs. This is further illustrated by the graph in FIG. 2. Notably, for any given pressure drop webs containing 1% or 10%, by weight, telomer evidence lower average particle penetrations compared to the control. In other words, the filtration efficiency of webs containing 1% or 10%, by weight, of the telomer is greater than the filtration efficiency of webs containing only polypropylene.

In order to investigate the thermal stability of electret treated meltblown air filtration media, several samples of the above materials were subjected to annealing at elevated temperature. Thermal annealing or so called "thermal aging", provides a first hand measure of the stability of an electret treated meltblown air filter medium. Thermal annealing was conducted in a forced air laboratory convection oven (Fisher Scientific). Samples of the electret treated meltblown medium described above was annealed at 130° F. (about 54° C.) for 180 hours. After thermal annealing the air filtration efficiency of the medium was measured and compared to its initial efficiency. Tables 4 through 6 contain the air filtration efficiency data for thermally annealed electret treated meltblown webs.

TABLE 4D

Change in Filtration Efficiency for Control Polypropylene Meltblown Webs after Thermal Annealing at 130° F. for 180 Hours

| Basis Weight (osy) | Initial Efficiency $\epsilon_i$ | Final Efficiency $\epsilon_f$ | Percent Change (%) |
|---|---|---|---|
| 0.5 | 72.6 | 40.3 | −45 |
| 0.75 | 84.7 | 56.7 | −33 |
| 1.0 | 90.5 | 66.7 | −26 |
| 1.5 | 95.9 | 80.7 | −16 |

TABLE 4E

Change in Filtration Efficiency for 1 Weight % Telomer/Polypropylene Meltblown Webs after Thermal Annealing at 130° F. for 180 Hours

| Basis Weight (osy) | Initial Efficiency $\epsilon_i$ | Final Efficiency $\epsilon_f$ | Percent Change (%) |
|---|---|---|---|
| 0.5 | 82.9 | 69.4 | −16 |
| 1.0 | 98.3 | 92.8 | −6 |
| 1.5 | 99.3 | 98.3 | −1 |

TABLE 4F

Change in Filtration Efficiency for 1 Weight % Telomer/Polypropylene Meltblown Webs after Thermal Annealing at 130° F. for 180 Hours

| Basis Weight (osy) | Initial Efficiency $\epsilon_i$ | Final Efficiency $\epsilon_f$ | Percent Change (%) |
|---|---|---|---|
| 0.5 | 84.5 | 70.1 | −17 |
| 1.0 | 98.1 | 90.0 | −8 |
| 1.5 | 99.3 | 96.8 | −2 |

The data presented in Tables 4D, 4E and 4F illustrate that the addition of the telomer to the polypropylene to form a blend significantly reduces the deterioration of filtration efficiency due to thermal annealing at elevated temperatures. At any given basis weight the percent change in efficiency following thermal annealing is significantly reduced by the addition of 1%, by weight, or 10%, by weight, of the telomer. Notably, the percent change in efficiency varies within a set of meltblown webs of different basis weights. This dependence on basis weight can be ascribed to the fact that the thermal annealing causes a loss of electrostatic charge in the media. Air filtration efficiency varies with the electrostatic charge, however, it is not a direct measure of the quantity or magnitude of charge in the media.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover or encompass all such modifications, alterations and/or changes. Furthermore, as used herein, the term "comprises" or "comprising" is inclusive or open-ended and does not exclude additional unrecited elements, compositional components, or method steps.

What is claimed is:

1. An electret material comprising:
   a porous material having an electrostatic charge and comprising a composite;
   said composite comprising (i) a polymeric matrix comprising a first thermoplastic, polymer that is a nonpolar polyolefin and from 0.5% to about 25% by weight of a second thermoplastic polymer relative to the weight of said composite wherein said second thermoplastic polymer comprises a telomer that comprises a polyolefin having a functional end group selected from the group consisting of acid anhydrides, carboxylic acids, amides, amines and derivatives thereof and (ii) from about 0.01% to about 30% by weight of a ferroelectric material dispersed therein.

2. The electret material of claim 1 wherein said first thermoplastic polymer and said telomer each comprise a polymer having a significant fraction of propylene repeat units.

3. The electret material of claim 1 wherein said first thermoplastic polymer and said telomer comprise a copolymer of propylene and ethylene.

4. The electret material of claim 2 wherein said first thermoplastic polymer comprises polypropylene and wherein said telomer comprises a polypropylene telomer having a functional group selected from acrylic acid, acid anhydrides, carboxylic acids and derivatives thereof.

5. The electret material of claim 1 wherein said ferroelectric material comprises a perovskite.

6. The electret material of claim 5 wherein said porous material comprises a nonwoven web and wherein said ferroelectric material has an average size less than about 2 micrometers.

7. The electret material of claim 1 wherein said ferroelectric material is selected from the group consisting of barium titanate, barium strontium titanate, lead titanate and solid solutions thereof.

8. The electret material of claim 1 wherein said porous material is selected from the group consisting of fibrillated films, sintered films, porous films, woven fabrics, foams, nonwoven webs and multilayer laminates thereof.

9. The electret material of claim 1 wherein said porous material is selected from the group consisting of meltblown fiber webs, spunbond fiber webs, hydroentangled webs, air-laid and bonded-carded webs.

10. The electret material of claim 1 wherein said porous material comprises a spunbond fiber web.

11. The electret material of claim 1 wherein said porous material comprises a meltblown fiber web.

12. The electret material of claim 1 wherein said telomer comprises from about 1% to about 15% by weight of said composite and said ferroelectric material comprises from about 0.5% to about 30% by weight of said composite.

13. The electret material of claim 12 wherein the first and second thermoplastic polymers comprise substantially compatible polyolefins.

14. The electret material of claim 1 wherein said second thermoplastic polymer comprises a nonpolar polymer which has been modified to include a plurality of polar functional groups.

15. The electret material of claim 14 wherein said second thermoplastic polymer comprises a polyolefin polymer randomly grafted to include a plurality of polar functional groups.

16. The electret material of claim 15 wherein said second thermoplastic polymer comprises from about 1% to about 25% by weight of said composite and said ferroelectric material comprises from about 0.5% to about 30% by weight of said composite and further wherein said porous material comprises a nonwoven web.

17. The electret material of claim 1 wherein said second thermoplastic polymer comprises a copolymer of two or more ethylinically unsaturated monomers wherein at least one of the monomers possesses a polar functional group.

18. The electret material of claim 17 wherein said second thermoplastic polymer comprises from about 1% to about 25% by weight of said composite and said ferroelectric material comprises from about 0.5% to about 30% by weight of said composite and further wherein said porous material comprises a nonwoven web.

19. A face mask comprising the electret material of claim 1.

20. A sterilization wrap comprising the electret material of claim 1.

21. A sterilization wrap comprising a spunbond/meltblown/spunbond laminate wherein at least one of said layers comprises the electret material of claim 1.

22. A dust wipe comprising the electret material of claim 1.

23. An air filter material comprising the electret material of claim 1.

* * * * *